United States Patent [19]

Sicard

[11] 4,048,947
[45] Sept. 20, 1977

[54] ROTARY DEVICE DRIVEN BY A MOVING FLUID

[76] Inventor: Charles Andre Sicard, 29 rue Dierville, 6211 Bucquoy, France

[21] Appl. No.: 650,742

[22] Filed: Jan. 20, 1976

[30] Foreign Application Priority Data

Jan. 22, 1975 France .............................. 75.01907

[51] Int. Cl.² .......................................... B63H 13/00
[52] U.S. Cl. ...................................... 115/3; 180/2 A; 290/55; 416/119; 416/240
[58] Field of Search ............... 416/111, 119, 139, 240; 180/2, 7; 115/3; 290/55

[56] References Cited

U.S. PATENT DOCUMENTS

| | | | |
|---|---|---|---|
| 247,266 | 9/1881 | Miller, Jr. | 416/119 |
| 279,066 | 6/1883 | Witherspoon | 416/119 |
| 535,120 | 3/1895 | Norberg | 416/119 |
| 1,024,066 | 4/1912 | Fletcher | 180/2 |
| 1,524,712 | 2/1925 | Hurd | 416/119 |
| 1,650,702 | 11/1927 | Folmer | 115/3 |
| 1,654,165 | 12/1927 | Felt | 290/55 |
| 3,212,470 | 10/1965 | Wiggin | 115/3 |
| 3,743,848 | 7/1973 | Strickland | 416/119 |

Primary Examiner—Trygve M. Blix
Assistant Examiner—Stuart M. Goldstein
Attorney, Agent, or Firm—Finnegan, Henderson, Farabow & Garrett

[57] ABSTRACT

A rotary device driven by a moving fluid, such as water or air, for generating a rotary movement comprises a cylindrical or frusto-conical rotor having a vertical axis, the rotor having a plurality of identical blades distributed around the periphery of the rotor, each blade having a symmetrical aerodynamic profile and being mounted so as to freely rotate about a substantially vertical axis parallel to its leading edge. The device may be used to power a screw driven boat, a wheeled vehicle or other machinery.

13 Claims, 9 Drawing Figures

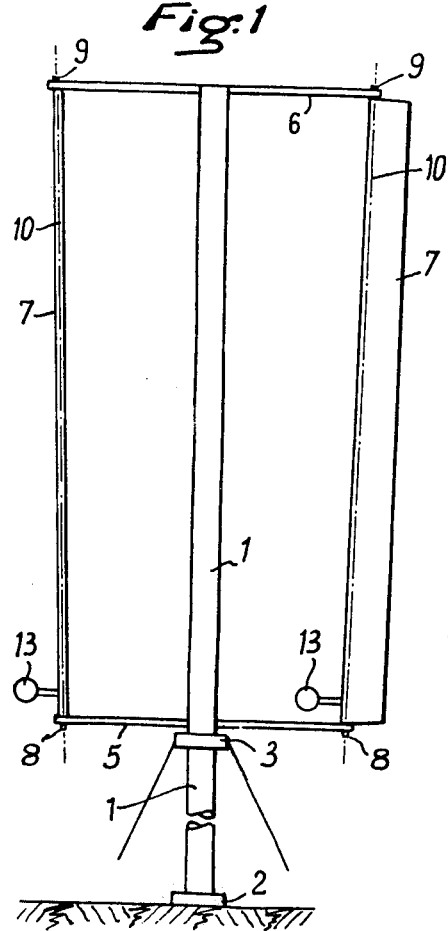
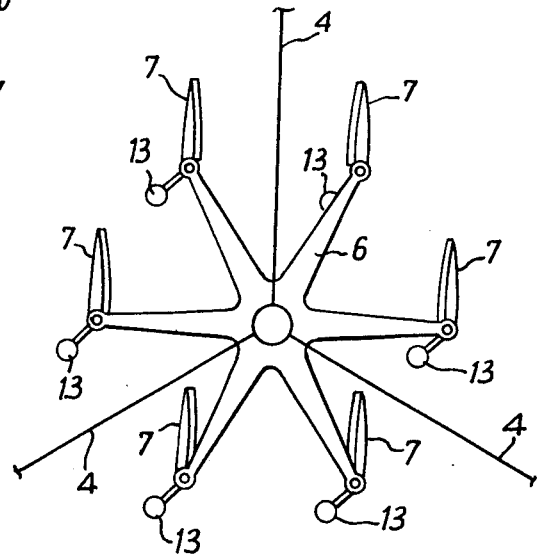
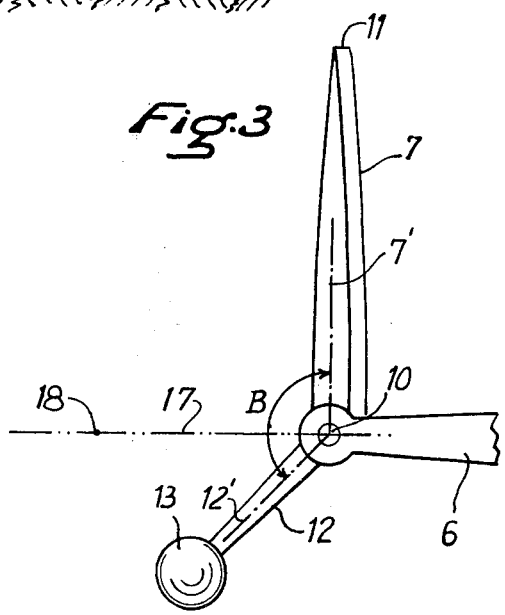
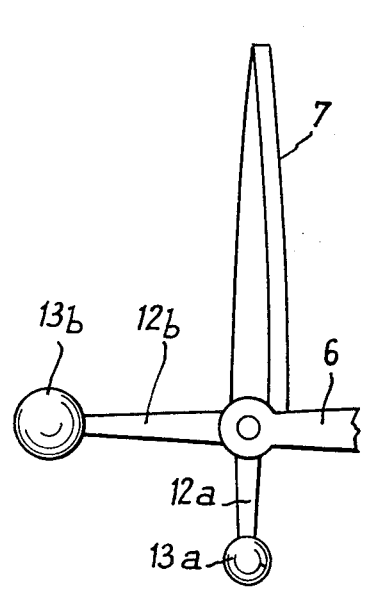

ROTARY DEVICE DRIVEN BY A MOVING FLUID

FIELD OF THE INVENTION

The present invention relates to a rotary device driven by a moving fluid such as water or air which can be used to drive any appropriate device such as a pump, an electric generator or a screw.

SUMMARY OF THE INVENTION

The device according to the present invention comprises: a generally cylindrical or frusto-conical rotor having a vertical axis, comprising a plurality of identical blades, distributed around the periphery of the rotor, each having a symmetrical aerodynamic profile and being mounted in such a way as to rotate freely about an axis which is substantially vertical and parallel to its leading edge. Each blade is preferably associated with a counterweight fitted to the end of an arm making an obtuse angle with the aerodynamic chord of said blade.

Preferably the rotor should not be strictly cylindrical, the distance between the foot of the blades and the vertical axis being less than that separating the tops thereof from the said axis in such a way that the rotor is slightly frusto-conical in shape.

According to a first embodiment, the rotor is mounted on a vertical shaft supported at its lower end by a bearing located on a horizontal surface and immediately under the lower supports of the blades by a bearing held by bracing, the said vertical shaft being provided with means for transmitting its rotary movement to any appropriate mechanism.

According to a second embodiment, the rotor is mounted at the top of the mast of a sea or land vehicle and comprises means for transmitting its rotary movement to a screw or to drive wheels.

Each blade therefore has a symmetrical profile and when the rotor rotates through 360° each blade is subjected to symmetrical stresses alternately on one and the other of the semi-profile.

The aerodynamic force passes from one side of the chord of the blade to the other twice per revolution of the rotor: the upper surface becomes the lower surface and vice versa.

However it is well known that a symmetrical profile does not provide the best aerodynamic performance. To achieve this the present invention also proposes to provide a blade which is symmetrical when at rest, but which under the effect of the aerodynamic forces deforms into a profile of the conventional type: in which the upper surface and the under surface have a curvature, the curvature of the upper surface being greater than the curvature of the under surface.

The "switching-over" of the aerodynamic lift force on the blade in the course of rotation brings about the switching-over of the deformation of the blade, and in this way the blade always has a suitable profile permitting optimum lift to be achieved.

The blade, symmetrical when at rest, is therefore capable of being deformed in one direction (relative to the chord) under the action of the aerodynamic force and can deform in an identical manner in the other direction after the switching-over of the aerodynamic force.

The invention will be described hereafter for a case in which the moving fluid is a mass of air, however it also applies equally to a case in which the moving fluid is a liquid.

BRIEF DESCRIPTION OF THE DRAWINGS

FIG. 1 shows a literal elevation of an embodiment of the invention, of which only two diametrically opposite blades are shown, one facing and the other in profile.

FIG. 2 shows a plan view on a reduced scale of the device according to FIG. 1.

FIG. 3 shows a detail of FIG. 2 on an enlarged scale.

FIG. 4 shows on enlarged scale a variant of the detail of FIG. 3.

Figure 5:
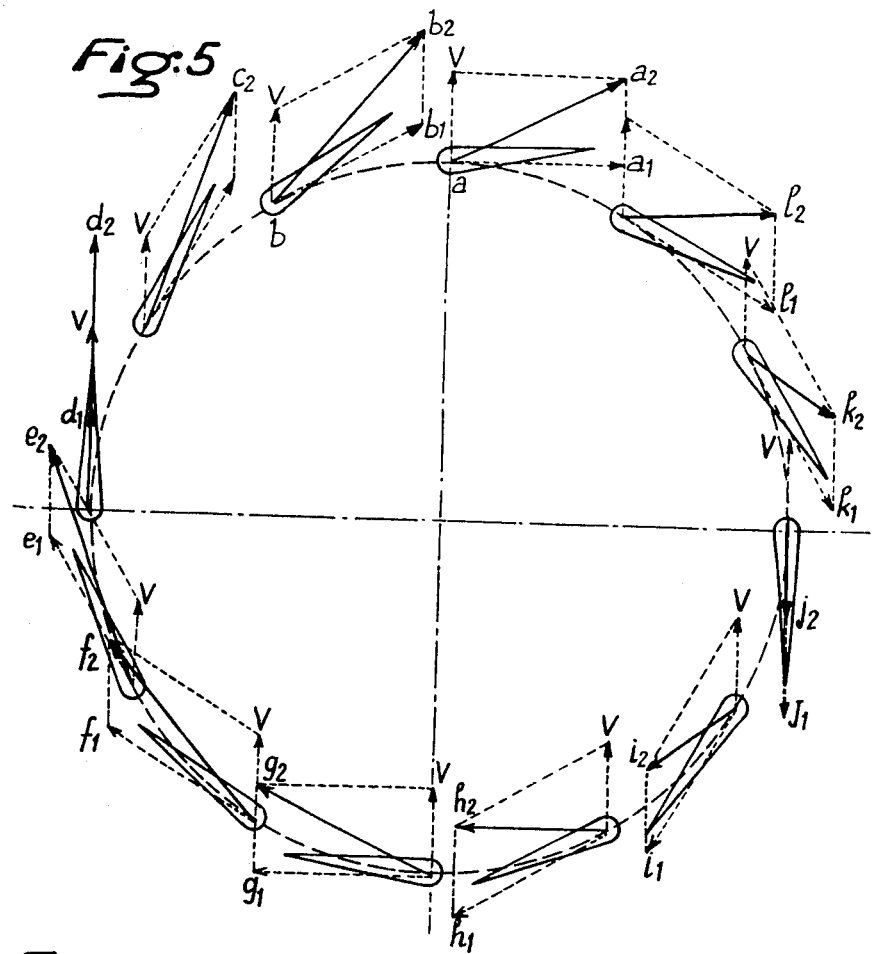
FIG. 5 is a diagram representing the various orientations of the resultant vector acting on a blade in movement.

Referring firstly to FIGS. 1 to 3, it can be seen that the device according to the invention comprises a vertical shaft 1, mounted so as to rotate between two bearings 2 and 3, the bearing 2 being fixed to a floor and the bearing 3 being held by braces 4.

On this shift 1 there are fitted two supports 5 and 6 each comprising six branches arranged in a star shape at 60° to one another; the length of the branches of the upper support 6 is slightly greater than that of the lower support 5.

Between each branch of the support 6 and the corresponding branch of the support 5 there is located a blade 7, in such a way that the assembly comprises six blades 7.

Each blade (FIG. 3) has a symmetrical aerodynamic profile and is mounted so as to rotate on the two supports 5 and 6 by the axes 8 and 9 which are located on a straight line 10 parallel to the leading edge 11 of the blade in question.

Each blade is integral with an arm 12 having a chord 12' making an obtuse angle B with a chord 7' of the blade and being provided at its extremity with a fly-weight 13 (FIG. 3.).

In FIG. 2 the rotor thus consituted is shown locked so that it cannot rotate, all the blades 7 being in the eye of the wind.

The length of the arm 12 and the value of the angle B are determined so that the centre of gravity approximately at 18 of the blade-fly-weight assembly is in a plane 17 passing through the axis of rotation 10 of the blade and at right angles to the chord, and is spaced from the axis 10.

Thus according to the variant shown in FIG. 4, the oblique arm 12 and the fly-weight 13 is replaced by two arms 12a and 12b at right angles and two fly-weights 13a and 13b, the arm 12 and fly-weight 13 being the resultant of the assembly 12a-13a, 12b, 13b. In this case the weight of the fly-weight 13a and the length of the arm 12a are determined in such a way as to balance the weight of the blade 7 relative to the axis 10.

Because of the slight inclination of the axis 10, the fly-weights tend to move outside the cylinder formed by the blades; this is particularly true when the rotor begins to rotate, under the effect of the centrifugal force. As a result, when the rotor turns, the blades have a certain incidence with the relative air flow created by the wind and they are therefore subjected to an aerodynamic lift force which tends to make them pivot until the radial centrifugal force resulting from the position of the centre of gravity and the lift balance one another out. The rotational torque exerted by the mass of each blade is zero since this force is radial, whereas the lift of each blade is not radial and the sum of the lifts of all the blades creates a rotational torque.

As the speed of rotation increases, an increase, in the speed of the apparent wind on each blade rising into the wind is caused and thus the lift of the blades rising into the wind is increased, and a reduction of the speed of the apparent wind on each blade descending to the wind and thus the lift on the blades descending to the wind is decreased. The result is an increase of the speed of rotation which continues until an equilibrium is established by virtue of the increase of the drag of the blades.

FIG. 5 shows schematically the values of the apparent wind vector for different positions of a single blade, measured from 30° to 30°.

In this Figure, the wind speed V is taken to be one meter/second and the peripheral speed of the blades is 2 meters/seconds. When a blade is in position $a$, the relative wind vector, due to its displacement is the vector $a_1$ tangential to the circle, while the wind vector is the vector V and the resultant is the vector $a_2$ which is the apparent wind vector acting on the blade; similarly in position $b$, the apparent wind vector is $b_2$; at $c$ is becomes $c_2$, etc ....

Thus it can be seen that the apparent wind vector is at its maximum at $d$ and at its minimum at $j$.

As the axis of rotation of the blade is located as near as possible to the leading edge and the centre of thrust is substantially towards the front third, the blade is consequently mounted as a wind vane and tends to place itself in the eye of the apparent wind. Since moreover the centrifugal force acting on the centre of gravity of the blade-fly-weight assembly tends to place the blade tangentially to the circle, the blade will take up an intermediate position all the more easily as the forces vary either as the angles of incidence or with the tangent to the circle.

Figure 6:
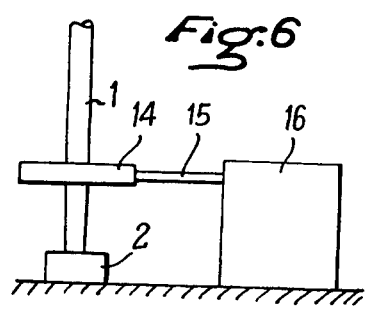
FIG. 6 shows a schematic view illustrating an embodiment of a device such as that in FIG. 1.

By referring to FIG. 6 it can be seen that a crown gear 14 can be located in the vicinity of the base of the shaft 1, which, by means of a counter shaft at an appropriate angle, drives a shaft 15 which drives a motor 16.

Figure 7:
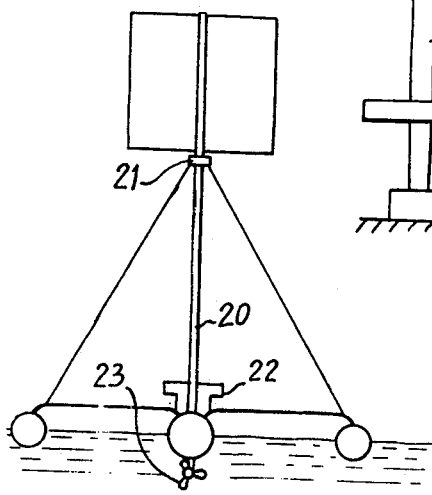
FIG. 7 shows a schematic view of a trimaran provided with a device similar to that shown in FIG. 1.
Figure 8:
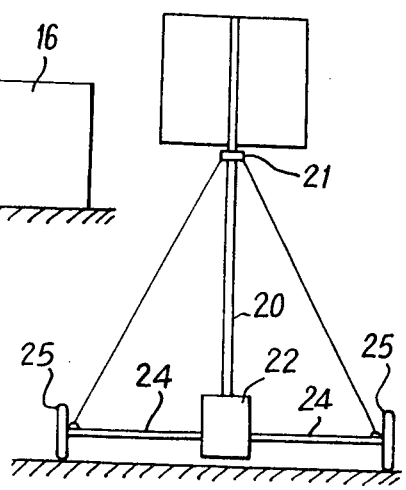
FIG. 8 shows a schematic view of a land vehicle, similar to a land yacht, provided with a device similar to that of FIG. 1.

By referring to FIGS. 7 and 8 it can be seen that the rotor may be located at the top of a mast 20 in such a way as to rotate in a bearing 21, driving by means of a gear arrangement 22 either a screw 23 or two half shafts 24 driving wheels 25.

In the case of FIG. 7, when the boat is moving into the wind by means of its screw 23, the speed of the apparent wind is increased by the speed of the boat, which increases the lift of the blades and thus the speed of rotation of the rotor. At this speed, the rotation of the rotor in the air flow causes the appearance of the Magnus effect which is exerted at right angles to the direction of fluid flow.

When the boat is sailing in a cross wind, the said Magnus effect is added or subtracted according to the direction of rotation of the motor. To take advantage of this effect, the direction of rotation of the motor can be changed by stopping it and inverting the orientation of the blades. When the wind is favourable it is even possible to disconnect the screw and use only the Magnus effect.

The same applies to the wheeled vehicle of FIG. 8.

In all the Examples shown, the rotor has a lower diameter smaller than its upper diameter so as to have a slightly frusto-conical shape. The object of this arrangement is to take into account the fact that the wind speed increases with altitude in the lower strata of the atmosphere, which in addition permits the self starting of the turbine.

It is preferable as far as possible that the angle of incidence of the blade in relation to the relative wind should be the same over the whole length of the blade; which amounts to saying that the distance from the axis of the blade to the axis of the rotor should as far as possible be proportional to the speed of the wind at that point on the blade under consideration.

In practice it is sufficient to displace in height anemometers separated by a vertical distance equal to the length of one blade until we have:

$$\frac{V}{R} = \frac{v}{r}$$

By way of example a wind engine was constructed in which the length of the arms 6 was 200 cm, the length of the arms 5 was 180 cm and the length of the blades was 800 cm which gave the axis 10 an inclination of 1°, 26.

As mentioned above the outward inclination of the blades 7 has the effect of permitting the fly-weights to have a radial position at rest outside the cone defined by the axes 10.

However, it is possible to construct a wind engine by arranging the axes 10 strictly vertically and parallel to one another, so that in rotation they define a cylinder. In this case it proves necessary to initiate movement to start the rotor by any appropriate means.

Figure 9:
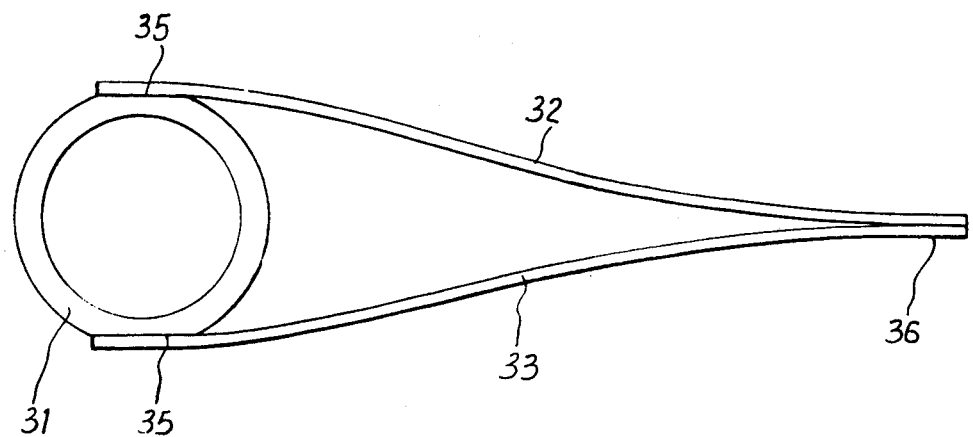
FIG. 9 shows a sectional view of the profile of the blade according to a preferred embodiment which permits the achievement of the optimum aerodynamic force efficiency.

FIG. 9 shows a preferred embodiment of the blade permitting optimum efficiency of aerodynamic force.

By referring to this Figure, it can be seen that the blade is composed of a tube 31 forming the leading edge and two sheets 32 and 33 constituting the profile of the blade and which, joined at their extremities, form the trailing edge of the blade.

The tube 31 is a standard metal tube of which the length is equal to that chosen for the blade. Two flat surfaces 34 and 35 are arranged along the entire length of the tube over a sufficient width to provide the necessary flat surface for the fixing of the sheets 32 and 33.

The sheets 32 and 33 are rectangular, of strong, flexible, light and deformable material. They are perferably of polyester but may also be made of sheet metal such as that sold under the name Dural or of steel.

Each sheet is attached flat to the tube by its front extremity, to the flat surface 34 for the sheet 32 and to the flat surface 35 for the sheet 33 by any known method, in particular by epoxy adhesive.

The free ends are then glued together, also using an epoxy adhesive so as to constitute, when joined, the trailing edge 34 of the blade.

By way of example and not of limitation the dimensions of the following blade is quoted here:

standard tube, length 6 meters, diametre 52 mm and having 2 flat sections, width 15 mm.

two polyester sheets 6 m × 40 cm × 2.5 mm.

I claim:

1. A rotatable device powered by a moving fluid such as water or air, comprising a generally cylindrical rotor disposed for rotation about a vertical axis, a plurality of blades mounted on said rotor adjacent its periphery for free unrestrained rotation, in normal usage, through 360° about essentially vertical axes passing through said blades, each of said blades having a symmetrical aerodynamic profile and a leading edge remote from the blade axis, a counterweight rigid with each of said blades, said blades and counterweight being constructed such that the center of gravity of each blade and its associated counterweight is spaced from associated blade axis and lies in a plane passing through the blade axis and which is perpendicular to a chord connecting said axis and the blade leading edge.

2. A device according to claim 1, in which each said blade is associated with two counterweights, a first counterweight being located at the end of an arm situated in a plane which passes through the axis of rotation of said blade and is at right angles to the chord of said blade; the second counterweight being located at the end of an arm situated in the extension of the chord of said blade and thus at 90° to the first counterweight, the second counterweight having a weight which balances the blade in relation to its axis of rotation.

3. A device according to claim 1, wherein said rotor is mounted fast on a vertical shaft mounted rotatably between two bearings, the lower bearing being fixed to a floor and the upper bearing being held by bracing.

4. A device according to claim 1, wherein said rotor is arranged at the top of a rotating mast fitted to a boat and said rotor drives a propulsive screw through a transmission.

5. A device according to claim 1, wherein said rotor is arranged at the top of a rotating mast fitted to a land vehicle and said rotor drives one or more drive wheels through a transmission.

6. A device as claimed in claim 1, wherein the diameter of said rotor is smaller at its lower end than at its upper end.

7. A device according to claim 1, further comprising transmission means interconnecting said rotor and a pump or rotor.

8. In the rotatable device as defined in claim 1 wherein said blade is symmetrical at rest and constructed in such a way that under the action of an aerodynamic force its profile is deformed so as to become a conventional wing profile and the deformation is identical and symmetrical in relation to the chord of said blade when the aerodynamic force acting on the blade passes from one side of the blade to the other.

9. In a rotatable device as defined in claim 8, said blade comprising a tube and two flexible sheets, said tube forming the leading edge of said rotor blade, said sheets being fixed to said tube at diametrically opposite flat surfaces while the free ends of said two sheets are glued together to constitute the trailing edge of said blade.

10. In a rotatable device as defined in claim 9, said tube being a standard metal tube.

11. In a rotatable device as defined in claim 9, said sheets being polyester sheets.

12. In a rotatable device as defined in claim 9, said sheets being metal sheets.

13. In a rotatable device as defined in claim 9, said sheets being joined to said tube and glued together to constitute the trailing edge by means of an epoxy adhesive.

* * * * *

UNITED STATES PATENT AND TRADEMARK OFFICE
CERTIFICATE OF CORRECTION

PATENT NO. : 4,048,947
DATED : September 20, 1977
INVENTOR(S) : Charles Andre Sicard It is certified that error appears in the above-identified patent and that said Letters Patent are hereby corrected as shown below:

Column 5, line 15, after "said" and before "axis", insert --blade--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks